US009634449B1

(12) United States Patent
Zhang et al.

(10) Patent No.: US 9,634,449 B1
(45) Date of Patent: Apr. 25, 2017

(54) SOFT CONTACTING ROTATIONAL INTERFACE FOR RF ROTARY JOINT

(71) Applicant: Princetel Inc., Hamilton, NJ (US)

(72) Inventors: Hong Zhang, Hamilton, NJ (US); Boying B. Zhang, Hamilton, NJ (US); Joe Ritacco, Hamilton, NJ (US); Jingrong Shen, Hamilton, NJ (US)

(73) Assignee: Princetel Inc., Hamilton, NJ (US)

(*) Notice: Subject to any disclaimer, the term of this patent is extended or adjusted under 35 U.S.C. 154(b) by 0 days.

(21) Appl. No.: 14/946,226

(22) Filed: Nov. 19, 2015

(51) Int. Cl.
*H01R 13/33* (2006.01)
*H01R 39/24* (2006.01)
*H01R 39/39* (2006.01)
*H02K 11/026* (2016.01)

(52) U.S. Cl.
CPC ............. *H01R 39/24* (2013.01); *H01R 39/39* (2013.01); *H02K 11/026* (2013.01)

(58) Field of Classification Search
CPC ...... H01R 13/33; H01R 39/24; H01R 39/381; G01S 7/521
USPC ...................... 439/13–30; 310/232, 239, 251
See application file for complete search history.

(56) References Cited

U.S. PATENT DOCUMENTS 3,229,234 A 1/1966 Lattanzi
4,298,850 A * 11/1981 Pellerin ................... H01P 1/067 333/257
4,398,113 A 8/1983 Lewis et al.
4,488,139 A * 12/1984 Snider, Jr. .......... H01R 13/6581 439/23
4,612,486 A * 9/1986 Ban ........................ H02K 29/12 310/113
6,517,357 B1 * 2/2003 Athanasiou ............ H01R 39/64 439/26
6,628,036 B1 * 9/2003 Lynch .................. H01R 39/381 310/239
2005/0264377 A1 12/2005 Faulkner et al.

* cited by examiner

*Primary Examiner* — Gary Paumen

(57) ABSTRACT

The current invention, by using a plurality of conductive fiber brush bundles and a coaxial line to transfer RF signal(s) between relatively rotatable objects, creates easy-maintenance, long duration a RF rotary joint with soft contacting rotational interfaces. It consists of a stationary shield conductor assembly, a stationary core conductor assembly, a rotational shield conductor assembly with a tapered round head, a rotational core conductor assembly with a tapered round head, and rotational and stationary insulating assemblies with a central bore. Both stationary and rotational shield conductor assemblies having a conductive fiber brush bundle, which further containing a plurality of hair-thin conductive filaments to form a symmetrical flexible tube. The interfaces of the core soft contacting rotational and the shield soft contacting rotational are formed between the free end portions of the conductive fiber brush bundles and the tapered round head of the rotational cone conductor and rotational shield conductor respectively.

12 Claims, 4 Drawing Sheets

SOFT CONTACTING ROTATIONAL INTERFACE FOR RF ROTARY JOINT

BACKGROUND OF THE INVENTION

The present invention relates generally to RF rotary joints, or microwave rotary joints, and more particularly to an apparatus having a plurality of conductive fiber brush bundles and a coaxial conductor to transfer RF signal(s) between relatively rotatable objects.

Rotary joints are used to change the direction of microwave propagation between two guides by rotating one with respect to other. RF rotary joints are electromechanical devices that consist of rotational (rotors) and stationary (stators) members. They allow the transmission of RF\microwave signals and power from their rotors to stators or vise verse.

A conventional RF rotary joints consists of either a contacting or non-contacting interface to transfer RF\microwave signals and power.

In non-contacting rotating interfaces, electrical continuity for RF is typically achieved by using λ/4 chokes, to correspond to the quarter wavelength of a particular frequency which eliminate the need for physical contact at the rotating junction. The advantage of a non-contacting interface is that all physical wear is eliminated. Disadvantages of this approach are size and weight, particularly at lower frequencies, which have longer wavelengths and therefore require longer chokes.

In contacting rotating interfaces, two relative rotatable conductive parts keep sliding contact by spring, or other actuators. The advantage of a contacting rotating interfaces is that size can be greatly reduced when compared to a ¼ wavelength choke interface. Disadvantages of contacting rotating interfaces are increased torque, the need for a tight and perfectly concentric fit of the rotating interface, and the fact that contact stress in rotation causes wear and the wear debris would cause electrical failure at the rotating interface. Please see the prior arts: U.S. Pat. No. 3,229,234 A and US2005\0264377A1.

Fiber brush technology has been successfully used in electrical slip ring industry, where, a brush assembly comprising a multifilament conductive fiber brush contacts with a conductive slip ring surface. The brush assembly is constructed with thousands of hair-fine silver alloy fibers running on their tips, offer significant improvement over carbon brushes in both data and current transfer, offering extended brush and slip ring service life, high current capacity, and significant decreases in service acoustic and electrical noise. Please see U.S. Pat. No. 4,398,113 A.

SUMMARY OF THE INVENTION

The objective in the current invention is to create soft contacting rotational interfaces for RF rotary joint with long service life, maintenance free, and high reliability by using a plurality of conductive fiber brush bundles and a coaxial line to transfer RF signal(s) between relatively rotatable objects.

DETAIL DESCRIPTION OF THE INVENTION

Figure 1:
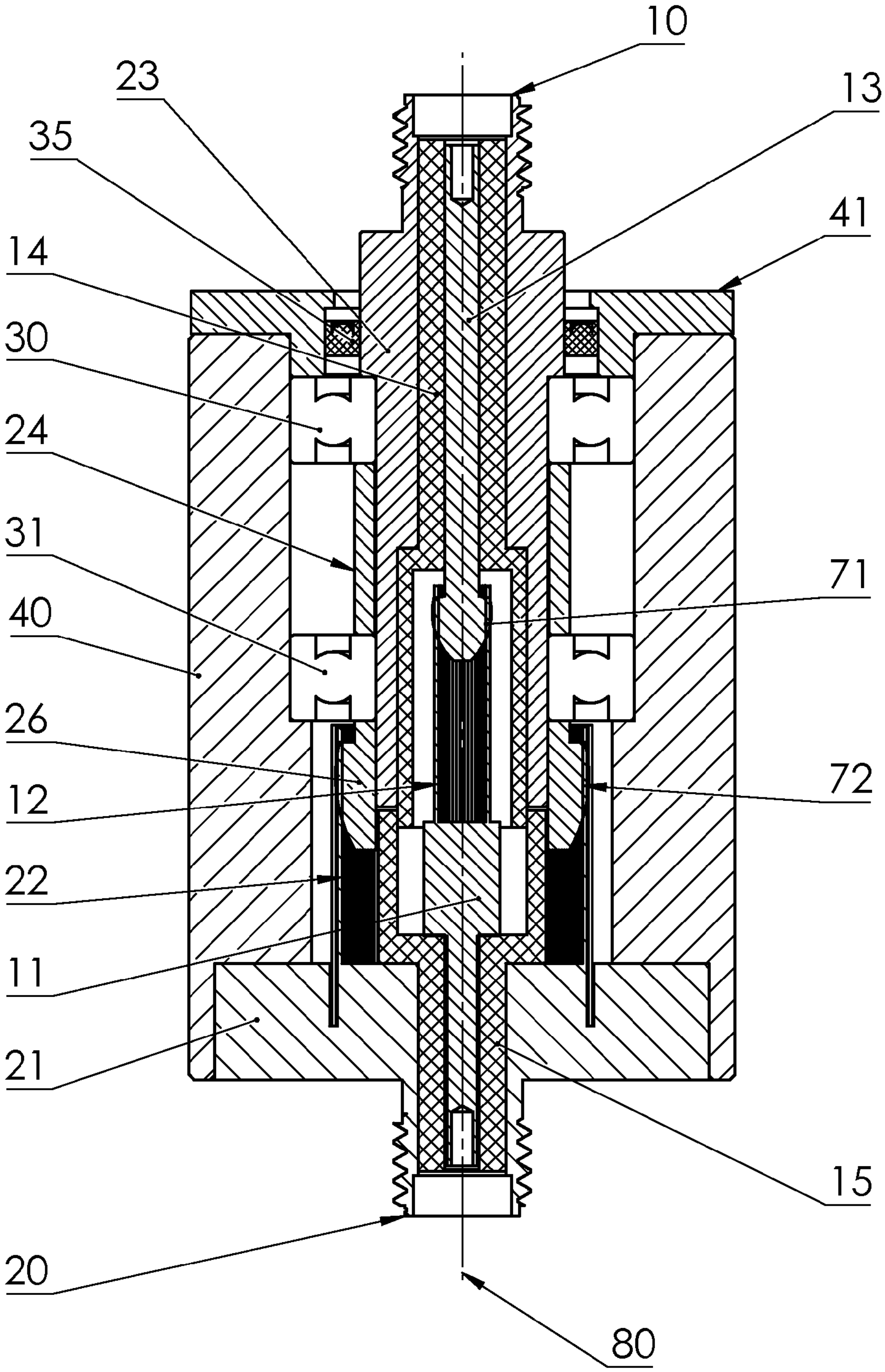
FIG. 1 illustrates the main embodiment of the RF rotary joint in the present invention.

A detailed explanation of preferred embodiment in the present invention with reference to FIG. 1, to FIG. 6 is as follows.

FIG. 1 shows a longitudinal sectional view of a single channel coaxial line RF rotary joint with soft contacting rotational interfaces in the present invention. The RF rotary joint consists mainly of a coaxial line with the soft contacting rotational interfaces, the stationary member and rotational member assembly and the RF receptacles (or connectors).

Figure 2:
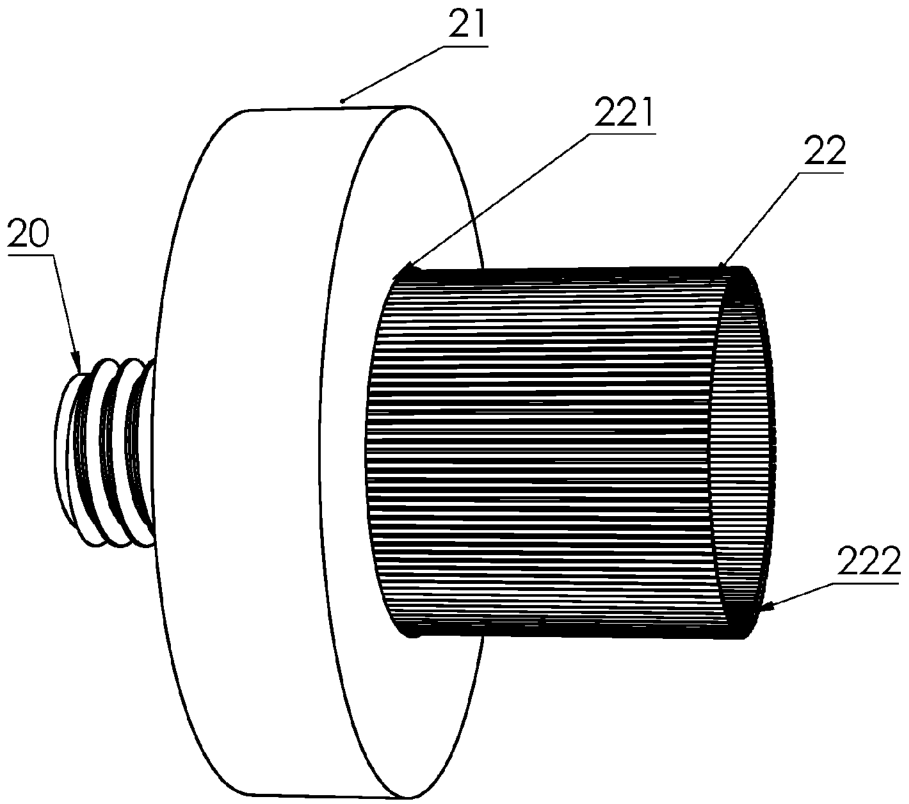
FIG. 2 is the detailed view of the stationary shield conductor assembly in the present invention.

In FIG. 1, the numbered items are described as follows:

10 - - - rotational RF receptacle (or connector)
11 - - - stationary core conductor;
12 - - - fiber brush bundle, stationary core conductor;
13 - - - rotational core conductor;
14 - - - rotational insulating spacer;
15 - - - stationary insulating spacer;
20 - - - stationary RF receptacle (or connector)
21 - - - stationary shield conductor;
22 - - - fiber brush bundle, stationary shield conductor;
23 - - - rotational shield conductor;
24 - - - bearing spacer;
26 - - - rotational shield conductor;
30 - - - bearing;
31 - - - bearing;
35 - - - seal;
40 - - - housing;
41 - - - end cap;
71 - - - core soft contacting rotational interface;
72 - - - shield soft contacting rotational interface;
80 - - - rotation axis of the RF rotary joint and the common geometric axis of all listed parts;

FIG. 2 is the detailed view of stationary shield conductor assembly. It consists of the stationary RF receptacle (or connector) 20, stationary shield conductor 21 and the conductive fiber brush bundle 22. Said fiber brush bundle 22 contains a plurality of hair-thin silver alloy filaments to form a symmetrical "hair tube" relative to axis 80. Said fiber brush bundle 22 has two end portion, 221 and 222. Said end portion 221 is coaxially and electrically fixed with stationary shield conductor 21.

Figure 3:
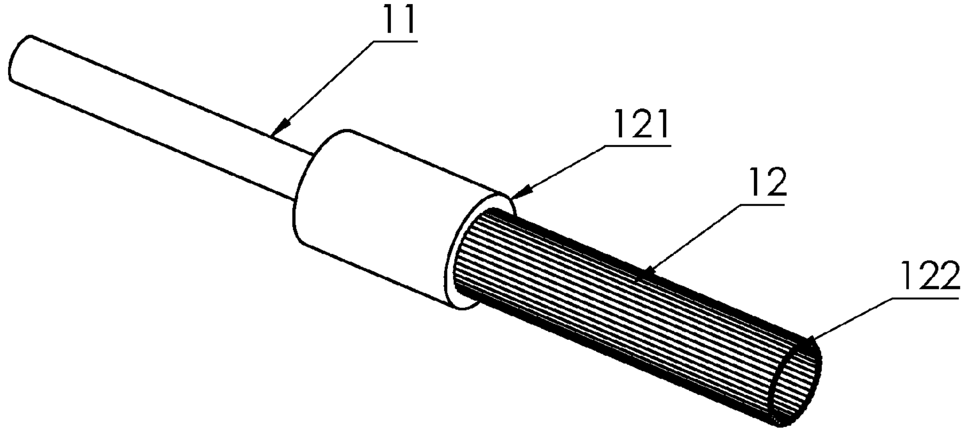
FIG. 3 is the detailed view of the stationary core conductor assembly in the present invention.

FIG. 3 is the detailed view of stationary core conductor assembly. It consists of the stationary core conductor 11 and the fiber brush bundle 12. Said fiber brush bundle 12 contains a plurality of hair-thin silver alloy filaments to form a symmetrical "hair tube" relative to axis 80. Said fiber brush bundle 12 has two end portion, 121 and 122. Said end portion 121 is coaxially and electrically fixed with stationary core conductor 11.

Figure 4:
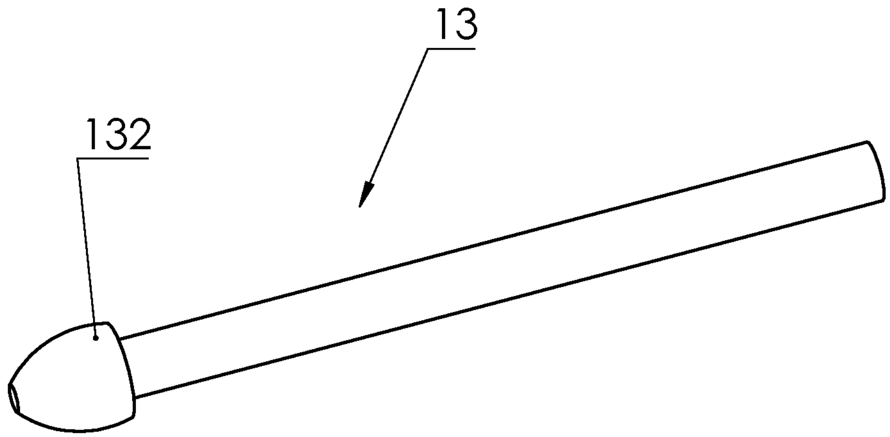
FIG. 4 shows the configuration of the rotational core conductor of the coaxial line in the present invention.

FIG. 4 shows the configuration of the rotational core conductor 13 of the coaxial line in the present invention. The rotational core conductor 13 have a coaxial tapered round head 132.

Figure 5:
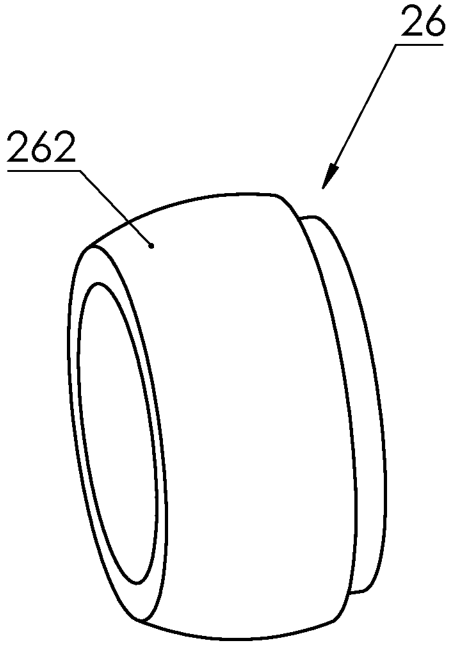
FIG. 5 shows the configuration of the rotational shield conductor of the coaxial line in the present invention.

FIG. 5 shows the configuration of the rotational shield conductor 26 of the coaxial line in the present invention. The rotational shield conductor 26 have a coaxial tapered round head 262.

Back to FIG. 1, said stationary core conductor assembly in FIG. 2 is coaxially fixed in the center bore of stationary shield conductor assembly and separated from stationary shield conductor 21 by stationary insulating spacer 15. The rotational shield conductor assembly includes rotational shield conductor 23 and 26. They are supported by two ball bearings 30 and 31 and rotatable relative to housing 40. Said rotational shield conductor 26 is fixed at the internal end portion of the rotational shield conductor 23. The rotational core conductor 13 in FIG. 5 is coaxially fixed in the center bore of said rotational shield conductor assembly and separated from rotational shield conductor 23 by rotational insulating spacer 14. The end portion 122 of the fiber brush bundle 12 is sized to have a constant physical contact with said tapered round head 132 of the rotational core conductor 13 during the rotation between the rotational RF receptacle (or connector) 10 and stationary RF receptacle (or connector) 20, so as to form the core soft contacting rotational interface 71 around the tapered round head 132 of the rotational core conductor 13. Similarly, the end portion 222 of the fiber brush bundle 22 is sized to have a constant physical contact with said tapered round head 262 of the rotational shield conductor 26 during the rotation between the rotational RF receptacle (or connector) 10 and stationary RF receptacle (or connector) 20, so as to form the shield soft contacting rotational interface 72 around the tapered round head 262 of the rotational shield conductor 26. The stationary insulating spacer 15 and rotational insulating spacer 14 have an overlap so that the core conductors are completely separated from shield conductors by dialectical material. The RF coaxial line is sealed by end cap 41 and shaft seal 35.

Figure 6A:
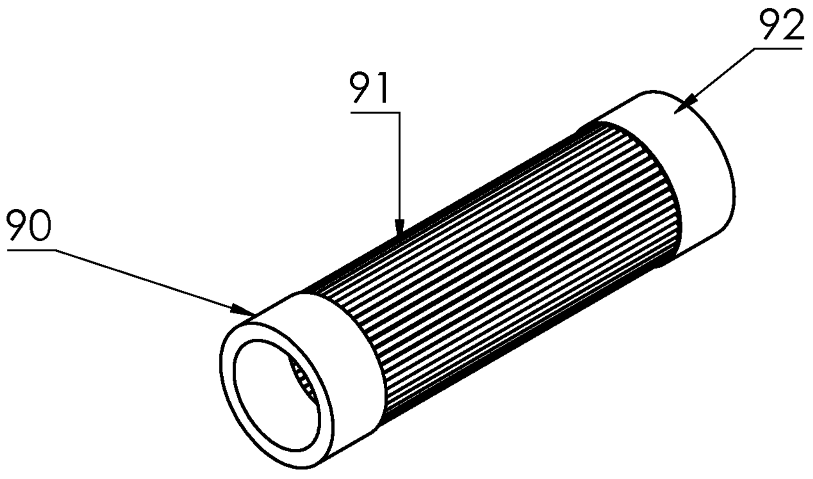
FIG. 6*a* is a braided conductive tube assembly before deformation in the present invention.
Figure 6B:
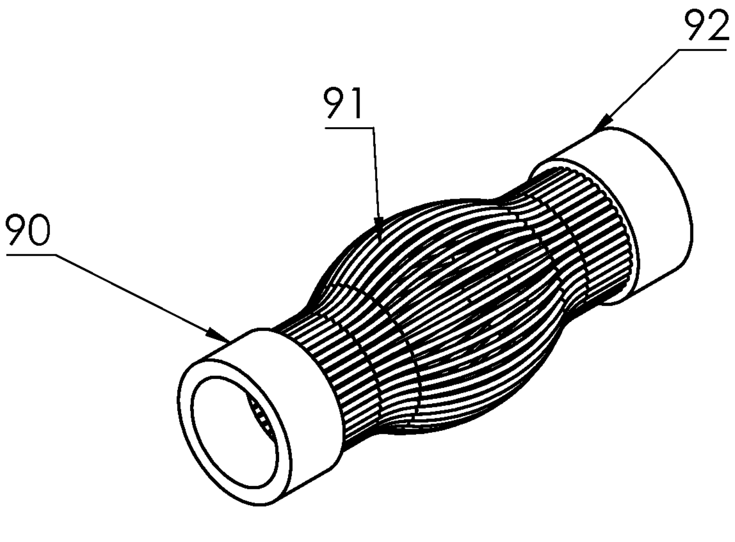
FIG. 6*b* is a braided conductive tube assembly after deformation in the present invention.

An alternative way to form soft contacting rotational interfaces is to use braided conductive tube assembly instead of conductive fiber brush bundles. The braided conductive tube is commercially available. They are flexible. FIG. 6*a* shows a braided conductive tube assembly in the present invention, which includes conductive ring 90, 92, and braided conductive tube 91. They are disposed concentrically. FIG. 6*b* is a braided conductive tube assembly after deformation by mating with the tapered round head of either core, or shield conductors in the present invention.

The invention claimed is:

1. A soft contacting rotational interface for transmitting RF signals comprising:

a stationary shield conductor assembly with a central bore;

a stationary core conductor assembly;

a stationary insulating assembly with a central bore;

a rotational shield conductor assembly with a central bore and tapered round head;

a rotational core conductor assembly with a tapered round head;

a rotational insulating assembly with a central bore;

a bearing assembly having two bearings; and said assemblies are coaxially disposed on a common axis, and said rotational assemblies being rotatable relative to said stationary assemblies through said bearing assembly, wherein said stationary shield conductor assembly further comprising a stationary RF receptacle or connector, a stationary shield conductor and a conductive fiber brush bundle; and said fiber brush bundle further containing a plurality of hair-thin conductive filaments to form a symmetrical flexible tube around said common axis; and said fiber brush bundle having two end portions, one of said end portions being coaxially and electrically fixed with said stationary shield conductor.

2. A soft contacting rotational interface for transmitting RF signals according to claim 1, wherein said stationary insulating assembly is disposed in said central bore of said stationary shield conductor assembly, and said stationary core conductor assembly is disposed in said central bore of said stationary insulating assembly and separated from said stationary shield conductor assembly by said central bore of said stationary insulating assembly around said common axis.

3. A soft contacting rotational interface for transmitting RF signals according to claim 1, wherein said rotational insulating assembly is disposed in said central bore of said rotational shield conductor assembly, and said rotational core conductor assembly is disposed in said central bore of said rotational insulating assembly and separated from said rotational shield conductor assembly by said central bore of said rotational insulating assembly around said common axis.

4. A soft contacting rotational interface for transmitting RF signals according to claim 1, wherein said stationary core conductor assembly further comprising a stationary core conductor and a conductive second fiber brush bundle; and said second fiber brush bundle further containing a plurality of hair-thin conductive filaments to form a symmetrical flexible tube around said common axis; and said second fiber brush bundle having two end portions, one of said end portion being coaxially and electrically fixed with said stationary core conductor.

5. A soft contacting rotational interface for transmitting RF signals according to claim 1, wherein said one end portion of said second fiber brush bundle in said stationary shield conductor assembly being sized to have a constant physical contact with said tapered round head in said rotational shield conductor assembly so as to form a shield soft contacting rotational interface around said tapered round head.

6. A soft contacting rotational interface for transmitting RF signals according to claim 4, wherein said one end portion of said second fiber brush bundle in said stationary core conductor assembly being sized to have a constant physical contact with said tapered round head in said rotational core conductor assembly so as to form a core soft contacting rotational interface around said tapered round head.

7. A soft contacting rotational interface for transmitting RF signals according to claim 5 or claim 6, wherein said core soft contacting rotational interface being totally isolated from said shield soft contacting rotational interface by said stationary insulating assembly and rotational insulating assembly.

8. A soft contacting rotational interface for transmitting RF signals comprising:

a stationary shield conductor assembly with a central bore;

a stationary core conductor assembly;

a stationary insulating assembly with a central bore;

a rotational shield conductor assembly with a central bore and tapered round head;

a rotational core conductor assembly with a tapered round head;

a rotational insulating assembly with a central bore;

a bearing assembly having two bearings; and said assemblies are coaxially disposed on a common axis, and said rotational assemblies being rotatable relative to said stationary assemblies through said bearing assembly; wherein said stationary core conductor assembly further comprising a stationary core conductor and a braided conductive tube assembly; and said braided conductive tube assembly having two end portions and one middle portion, one of said end portions being coaxially and electrically fixed with said stationary core conductor.

9. A soft contacting rotational interface for transmitting RF signals according to claim 8, wherein said stationary insulating assembly is disposed in said central bore of said stationary shield conductor assembly, and said stationary core conductor assembly is disposed in said central bore of said stationary insulating assembly and separated from said stationary shield conductor assembly by said central bore of said stationary insulating assembly around said common axis.

10. A soft contacting rotational interface for transmitting RF signals according to claim 8, wherein said rotational insulating assembly is disposed in said central bore of said rotational shield conductor assembly, and said rotational core conductor assembly is disposed in said central bore of said rotational insulating assembly and separated from said rotational shield conductor assembly by said central bore of said rotational insulating assembly around said common axis.

11. A soft contacting rotational interface for transmitting RF signals according to claim 8, wherein said middle portion of said braided conductive tube assembly in said stationary shield conductor assembly is sized to have a constant physical contact with said tapered round head in said rotational shield conductor assembly so as to form a shield soft contacting rotational interface around said tapered round head.

12. A soft contacting rotational interface for transmitting RF signals according to claim 8 or claim 11, wherein said core soft contacting rotational interface being totally isolated from said shield soft contacting rotational interface by said stationary insulating assembly and rotational insulating assembly.

* * * * *